United States Patent
Sanderovich et al.

(10) Patent No.: US 10,187,817 B2
(45) Date of Patent: Jan. 22, 2019

(54) MEASURING DISTANCE IN WIRELESS DEVICES

(71) Applicant: QUALCOMM Incorporated, San Diego, CA (US)

(72) Inventors: Amichai Sanderovich, Atlit (IL); Carlos Horacio Aldana, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 268 days.

(21) Appl. No.: 15/088,108

(22) Filed: Mar. 31, 2016

(65) Prior Publication Data

US 2016/0353306 A1    Dec. 1, 2016

Related U.S. Application Data (60) Provisional application No. 62/167,145, filed on May 27, 2015.

(51) Int. Cl.
| | | |
|---|---|---|
| *H04W 24/10* | (2009.01) | |
| *H04L 12/26* | (2006.01) | |
| *G01S 13/76* | (2006.01) | |
| *H04W 64/00* | (2009.01) | |

(52) U.S. Cl.
CPC .......... *H04W 24/10* (2013.01); *G01S 13/765* (2013.01); *G01S 13/767* (2013.01); *H04L 43/106* (2013.01); *H04W 64/00* (2013.01)

(58) Field of Classification Search
None
See application file for complete search history.

(56) References Cited

U.S. PATENT DOCUMENTS

| | | | |
|---|---|---|---|
| 2012/0133558 A1* | 5/2012 | Fretenburg | G01S 13/325 342/378 |
| 2012/0163261 A1* | 6/2012 | Vedantham | H04W 52/0206 370/311 |
| 2014/0171109 A1 | 6/2014 | Segev | |
| 2014/0335885 A1 | 11/2014 | Steiner et al. | |
| 2015/0257028 A1* | 9/2015 | Chu | G01S 13/74 370/252 |
| 2016/0366548 A1* | 12/2016 | Wang | H04W 64/00 |

(Continued)

FOREIGN PATENT DOCUMENTS

| | | |
|---|---|---|
| WO | WO-2014182800 A1 | 11/2014 |
| WO | WO-2014194147 A1 | 12/2014 |

OTHER PUBLICATIONS

Aldana C., et al., "802.11-2012 CID_ 46_47_48; 11-12-1249-04-000m-802-11-2012-cid-46-47-48", QUALCOMM, IEEE SA Mentor; 11-12-1249-04-000M-802-11-2012-CID-46-47-48, IEEE-SA Mentor, Piscataway, NJ USA, vol. 802.11m, No. 4, Jan. 17, 2013 (Jan. 17, 2013), pp. 1-17, XP068040038.

(Continued)

*Primary Examiner* — Chi H Pham
*Assistant Examiner* — Vladislav Y Agureyev
(74) *Attorney, Agent, or Firm* — Baia Ramasamy; Patterson & Sheridan, L.L.P.

(57) ABSTRACT

Aspects of the present disclosure provide techniques for efficient ranging. According to certain aspects, techniques are provided to signal the use of different resolutions of time units for parameters to be used in a ranging procedure, such as a fine timing measurement (FTM) procedure.

30 Claims, 7 Drawing Sheets

(56) References Cited

U.S. PATENT DOCUMENTS

2017/0019231 A1 1/2017 Mammoser et al.
2017/0019321 A1 1/2017 Aldana et al.

OTHER PUBLICATIONS

International Search Report and Written Opinion—PCT/US2016/025556—ISA/EPO—Jul. 22, 2016.
Stanton K et al: "Addition of p802 .11-MC Fine Timing Measurement (FTM) to p802 .1AS-Rev: Tradeoffs and Proposals Rev 0.9 ; as-Kbstanton-Caldana-Ftm-Addition-to-1as-Guiding-Principles-and-Proposal-0315-V09", IEEE Draft; As-Kbstanton-Caldana-Ftm-Addition-To-1as-Guiding-Principles-And-Proposal-0315-v09,IEEE-SA, Piscataway, NJ USA, vol. 802, No. v09, Mar. 6, 2015 (Mar. 6, 2015), pp. 1-22, XP068096405, [retrieved on Mar. 6, 2015] the whole document.

\* cited by examiner

MEASURING DISTANCE IN WIRELESS DEVICES

CLAIM OF PRIORITY UNDER 35 U.S.C. § 119

The present Application for Patent claims benefit of U.S. Provisional Patent Application Ser. No. 62/167,145, filed May 27, 2015, assigned to the assignee hereof and hereby expressly incorporated by reference herein.

BACKGROUND

Field of the Disclosure

Certain aspects of the present disclosure generally relate to wireless communications and, more particularly, to efficient ranging and distance measurement in wireless devices.

Description of Related Art

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the desire for greater coverage and increased communication range, various schemes are being developed. One such scheme is the sub-1-GHz frequency range (e.g., operating in the 902-928 MHz range in the United States) being developed by the Institute of Electrical and Electronics Engineers (IEEE) 802.11ah task force. This development is driven by the desire to utilize a frequency range that has greater wireless range than wireless ranges associated with frequency ranges of other IEEE 802.11 technologies and potentially fewer issues associated with path losses due to obstructions.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications in a wireless network.

Aspects of the present disclosure provide an apparatus for wireless communications. The apparatus generally includes a processing system configured to generate a first frame providing an indication of one or more resolutions of units of time to use for one or more parameters (at least one parameter) to be used in a ranging procedure performed with a wireless node and a first interface configured to output the first frame for transmission to the wireless node.

Aspects of the present disclosure provide an apparatus for wireless communications. The apparatus generally includes a first interface configured to obtain a first frame transmitted from a wireless node and a processing system configured to determine, based on an indication in the first frame (indicating), one or more resolutions of units of time to use for one or more parameters to be used in a ranging procedure performed with the wireless node and perform the ranging procedure with the wireless node according to the determined resolutions.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Aspects of the present disclosure generally relate to wireless communications and, more particularly, to techniques for measuring distance based on an exchange of fine timing measurement (FTM) frames or messages. As used herein, the terms frame and message are used interchangeably. According to certain aspects, signaling may be provided that indicates a resolution for one or more FTM parameters.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various broadband wireless communication systems, including communication systems that are based on an orthogonal multiplexing scheme. Examples of such communication systems include Spatial Division Multiple Access (SDMA) system, Time Division Multiple Access (TDMA) system, Orthogonal Frequency Division Multiple Access (OFDMA) system, and Single-Carrier Frequency Division Multiple Access (SC-FDMA) system. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA" such as an "AP STA" acting as an AP or a "non-AP STA") or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the AT may be a wireless node. Such wireless node may provide, for example, connectivity for or to a network (e.g., a wide area network such as the Internet or a cellular network) via a wired or wireless communication link.

An Example Wireless Communications System

Figure 1:
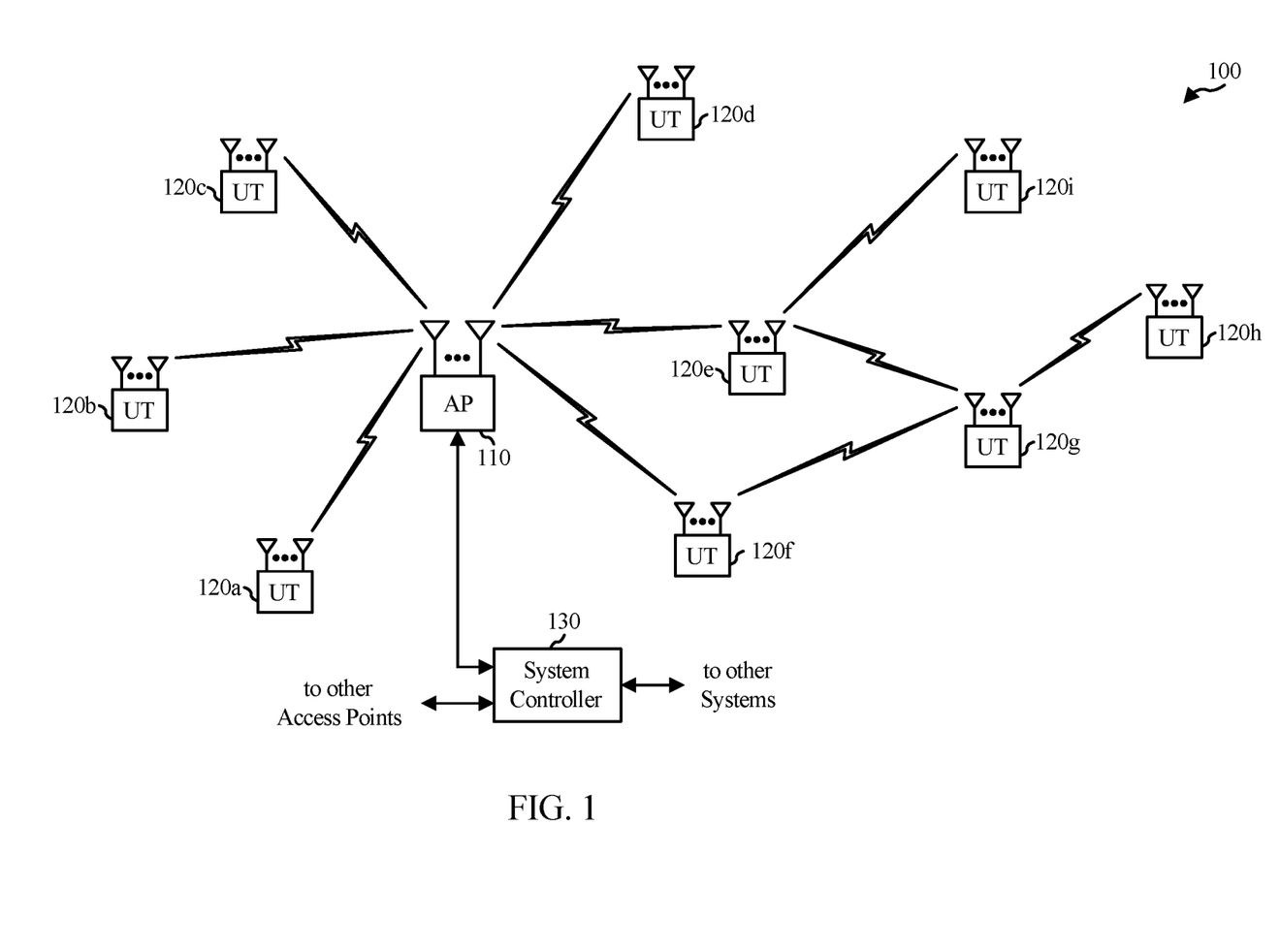
FIG. 1 illustrates a diagram of an example wireless communications network, in accordance with certain aspects of the present disclosure.

FIG. 1 illustrates a system 100 in which aspects of the disclosure may be performed. For example, any of the wireless stations including the access point 110 and/or the user terminals 120 may be in a neighbor aware network (NAN). Wireless stations may exchange fine timing measurement (FTM) information for ranging during a period when the wireless stations are already scheduled to wake up (e.g., during a paging window or data window) and may exchange the FTM information using existing frames (e.g., association frames, trigger frames and/or/polling frames, probe request/probe response frames). In aspects, one of the wireless devices may act as a ranging proxy.

The system 100 may be, for example, a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal.

A system controller 130 may provide coordination and control for these APs and/or other systems. The APs may be managed by the system controller 130, for example, which may handle adjustments to radio frequency power, channels, authentication, and security. The system controller 130 may communicate with the APs via a backhaul. The APs may also communicate with one another, e.g., directly or indirectly via a wireless or wireline backhaul.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
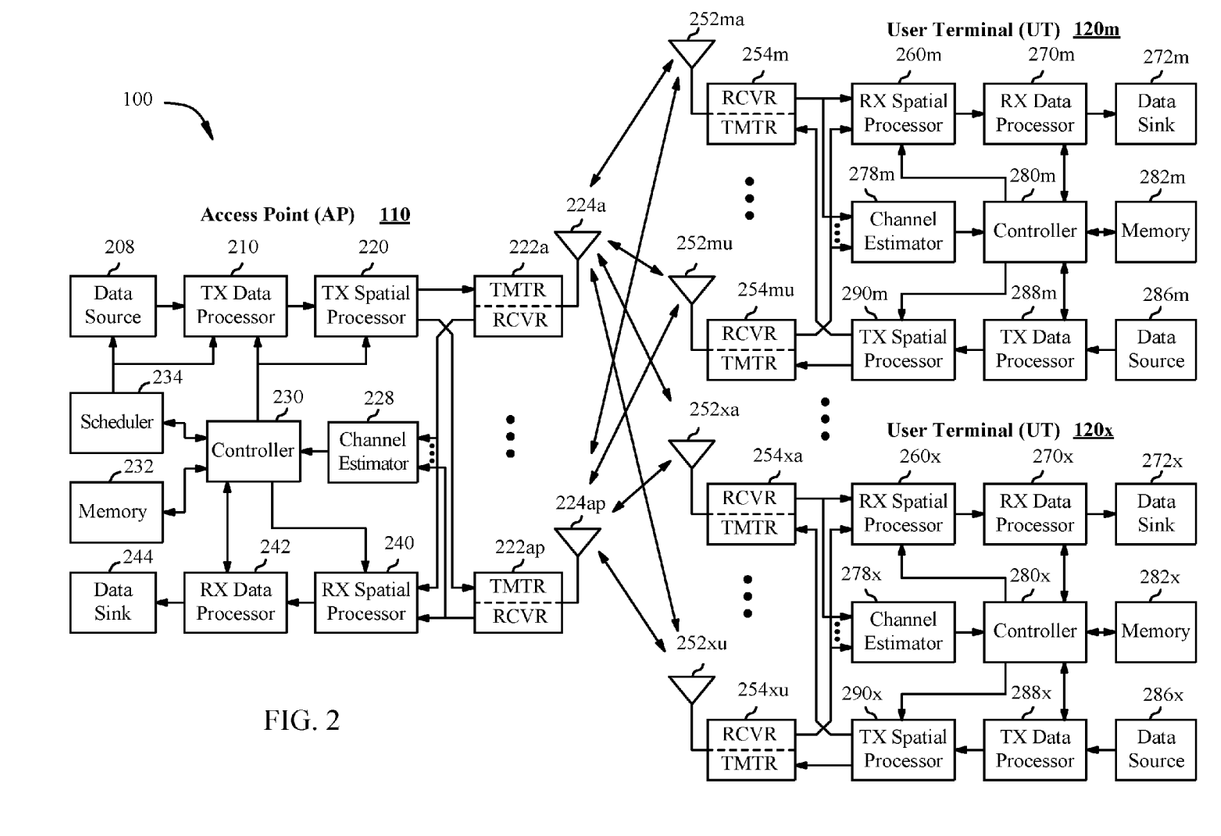
FIG. 2 illustrates a block diagram of an example access point and user terminals, in accordance with certain aspects of the present disclosure.

FIG. 2 illustrates example components of the AP 110 and UT 120 illustrated in FIG. 1, which may be used to implement aspects of the present disclosure. One or more components of the AP 110 and UT 120 may be used to practice aspects of the present disclosure. For example, antenna 224, Tx/Rx 222, and/or processors 210, 220, 240, 242, of the AP 110, and/or controller 230 or antenna 252, Tx/Rx 254, processors 260, 270, 288, and 290, and/or controller 280 of UT 120 may be used to perform the operations 700 and 700A described herein and illustrated with reference to FIGS. 7 and 7A, respectively, and operations 900 and 900A described herein and illustrated with reference to FIGS. 9 and 9A, respectively.

FIG. 2 illustrates a block diagram of access point 110 two user terminals 120m and 120x in a MIMO system 100. The access point 110 is equipped with $N_t$ antennas 224a through 224ap. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a transmit (TX) data processor 288 receives traffic data from a data source 286 and control data from a controller 280. The controller 280 may be coupled with a memory 282. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ the generated uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing. The controller 230 may be coupled with a memory 232.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

The decoded data for each user terminal may be provided to a data sink 272 for storage and/or a controller 280 for further processing.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, at access point 110, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
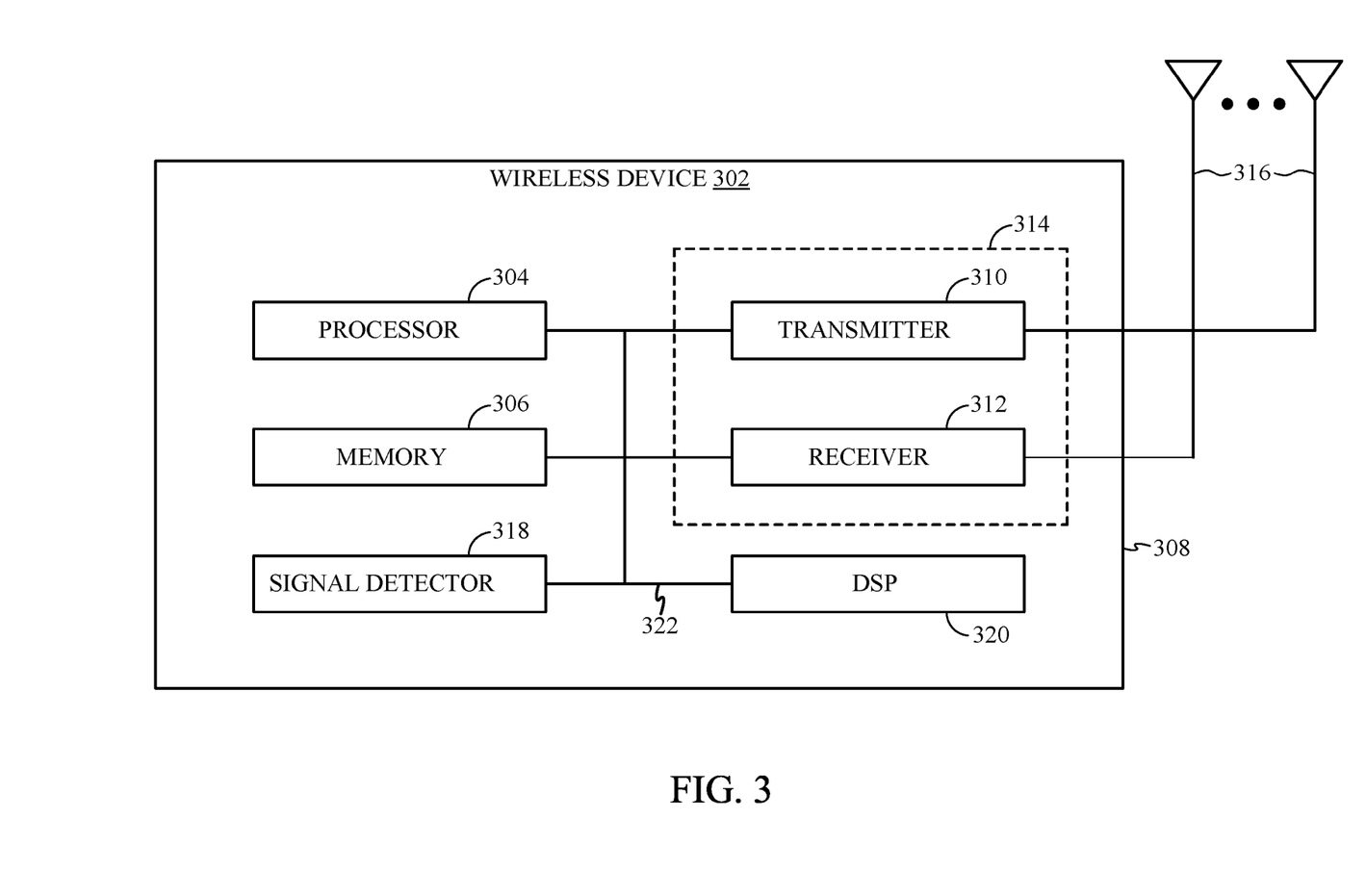
FIG. 3 illustrates a block diagram of an example wireless device, in accordance with certain aspects of the present disclosure.

FIG. 3 illustrates various components that may be utilized in a wireless device 302 that may be employed within the MIMO system 100. The wireless device 302 is an example of a device that may be configured to implement the various methods described herein. For example, the wireless device may implement operations 700 and 900 illustrated in FIGS. 7 and 9, respectively. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote node. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Example Ranging/Distance Measurement with FTM

Aspects of the present disclosure provide mechanisms for signaling the use of different resolutions for units of time of different parameters used in procedures involving wireless stations. For example, the mechanism may allow for the use of different resolutions for certain parameters in a ranging procedure, such as a fine timing measurement (FTM) ranging procedure. The ability to signal different resolutions may allow more accurate timing measurements in certain cases, which may lead to more accurate distance measurements.

Fine timing measurement (FTM) generally refers to a ranging protocol (e.g., as defined in the IEEE 802.11mc wireless standard) that measures the distance between two stations (STAs) by measuring round trip travel time (RTT) of messages transmitted between an initiating STA and a responding STA. FTM may have a ranging accuracy of around 3 meters. A single burst FTM measurement can be accomplished by exchanging 6 frames between the initiating STA and the responding STA.

Figure 4:
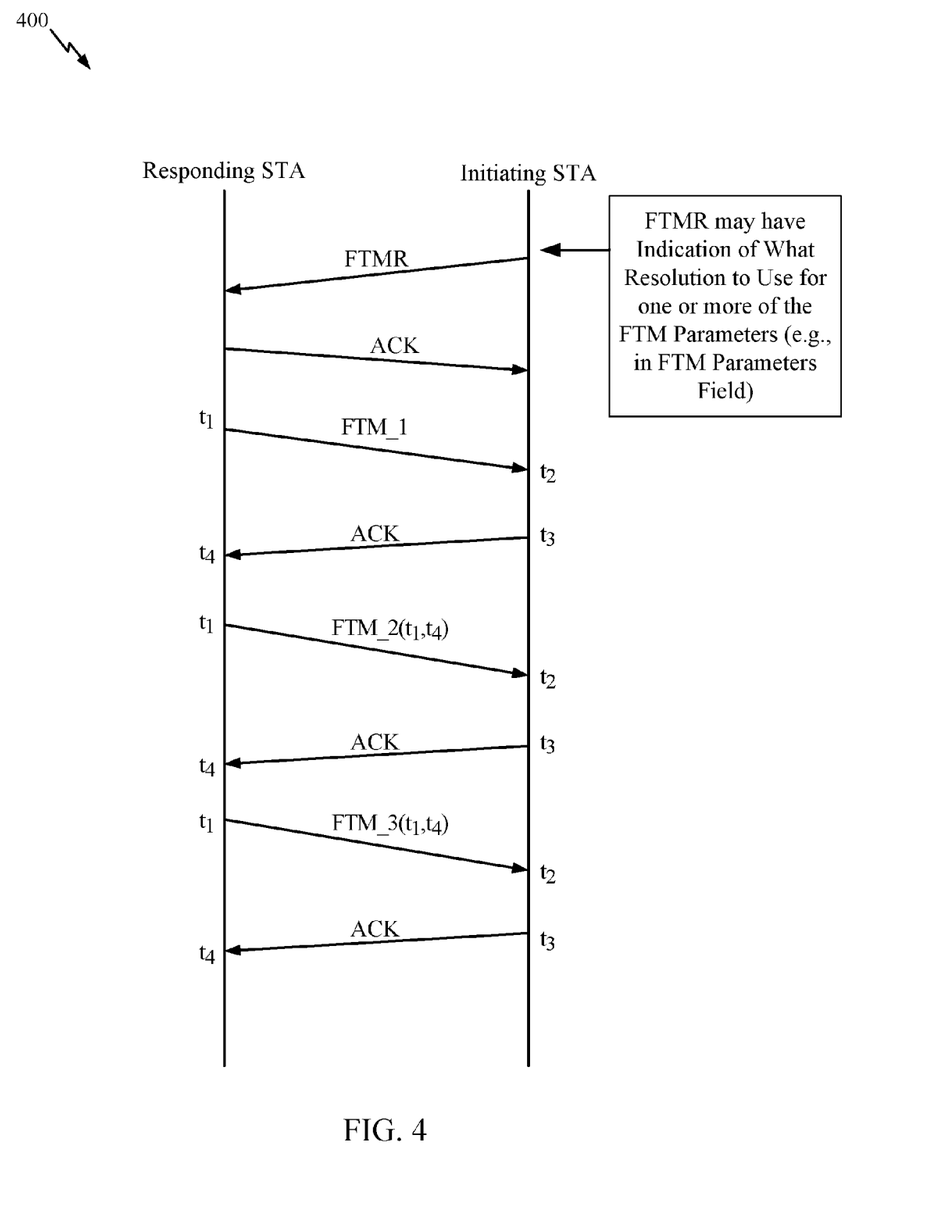
FIG. 4 is an example call flow illustrating a frame exchange for a fine timing measurement (FTM) procedure, in accordance with certain aspects of the present disclosure.

FIG. 4 is an example call flow 400 illustrating a frame exchange for an example FTM procedure. As shown in FIG. 4, the Initiating STA may send an FTM Request (FTMR) frame to the Responding STA to start the FTM procedure. As will be described in greater detail below, the FTMR may include an indication of a resolution of units of time to use for one or more parameters to be used in a ranging procedure performed with a second apparatus (e.g., a wireless node).

The Responding STA may send an ACK to the Initiating STA. After the FTMR and ACK, the Responding STA may start sending FTM frames (with the transmission times for the FTM frames indicated as $t_1$) which may be received by the Initiating STA at a time indicated as $t_2$. At $t_3$ the Initiating STA may respond with an ACK which may be received by the Responding STA at $t_4$.

As illustrated, these steps may be repeated for each FTM frame (FTM_1, FTM_2, FTM_3) transmitted by the Responding STA, for a total burst exchange of 6 FTM frames. In each case, the current FTM frame may have the $t_1$ and the $t_4$ values from the previous FTM frame embedded (e.g., FTM2 has the $t_1$ and the $t_4$ values from the FTM1 exchange). The Initiating STA may then use $t_1$, $t_2$, $t_3$, and $t_4$ (since it already knows t2 and t3, having received an FTM at t2 and having sent an ACK at t3) to estimate the RTT between the Responding STA and the Initiating STA.

The RTT may be used estimate the range (distance) between the two wireless stations. To determine its own 2D location, one wireless station may acquire RTT measurements from at least three other wireless stations that may have known 2D locations. The wireless station may use the RTT measurements from the other wireless stations to compute its own 2D location. This may increase the number of exchanged FTM frames and reduce network throughput.

FTM may be used as a way to measure range between two devices and may be included in physical layer (PHY) specifications of devices according to various versions of standards. Examples of such devices include devices capable of high throughput (HT), very high throughput (VHT) and also directional multigigabit (DMG) communications.

As used herein, the term DMG generally refers to operation in frequency bands with a starting frequency above 45 GHz. The term DMG may be used in contrast to more frequency-specific terms LB (Low Band at 2.4 GHz), HB (High Band at 5 GHz), and UB (Ultra Band at 60 GHz). DMG communications may utilize, for example, a "60 GHz" band from 57 GHz to 66 GHz.

Some of the principal parameters in certain versions of FTM may have unit resolutions that are optimized for operation in certain frequencies, such as 2.4 GHz and 5 GHz. Unfortunately, resolutions optimized for one frequency may not be optimal for another frequency. As a result, devices capable of operating in different modes (frequency ranges) may suffer if they are limited to any fixed set of resolutions.

Aspects of the present disclosure, however, provide for signaling to indicate different resolutions for time units of various FTM parameters (contained in a frame) in a manner that may be backwards compatible. For example, such a mechanism may utilize a format of an existing message structure containing fields for FTM parameters, with a modification of various parameters (e.g., using different resolutions) to enable operation also in DMG mode.

In some cases, enabling FTM in devices capable of operating in a DMG mode may open up new options for FTM products. Such options may include, for example, fine range resolution (e.g., on the order of millimeters rather than meters). Further, enhanced throughput and reduced latency of DMG may allow extensive FTM messaging and operation without efficiency reduction. This may allow devices to achieve accurate results for FTM measurements, even when one or more of the devices involved are moving.

Figure 5:
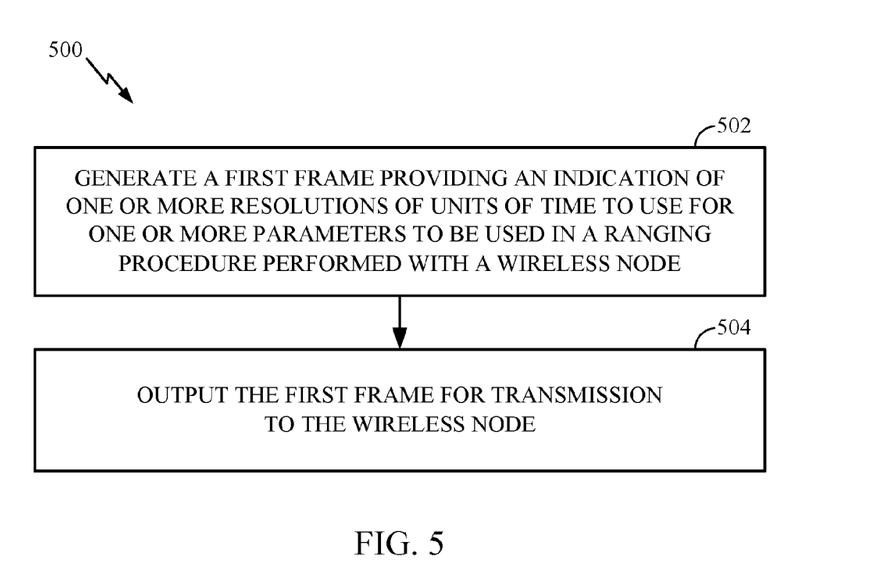
FIG. 5 illustrates a block diagram of example operations for wireless communications by an initiating apparatus (e.g., configured to initiate a ranging procedure), in accordance with certain aspects of the present disclosure.

FIG. 5 illustrates a block diagram of example operations 500 for wireless communications by an apparatus, in accordance with certain aspects of the present disclosure.

The operations 500 may be performed, for example, by an initiating STA (e.g., the apparatus may be a user terminal 120 or other type wireless station). The operations 500 begin, at 502, by generating a first frame providing an indication of a resolution of units of time to use for one or more parameters to be used in a ranging procedure performed with a wireless node. As illustrated in FIG. 4, in some cases, the indication may be provided in an FTM parameters field of an FTM request (FTMR) frame. At 504, the initiating STA may output the first frame for transmission to the wireless node. The receiving apparatus, in some cases, may reject use of the indicated parameters. If the receiving apparatus rejects in this manner, the initiating device may propose other parameters. In some cases, the receiving apparatus may generate a frame confirming it accepts using the parameters indicated by the initiating apparatus.

Figure 6:
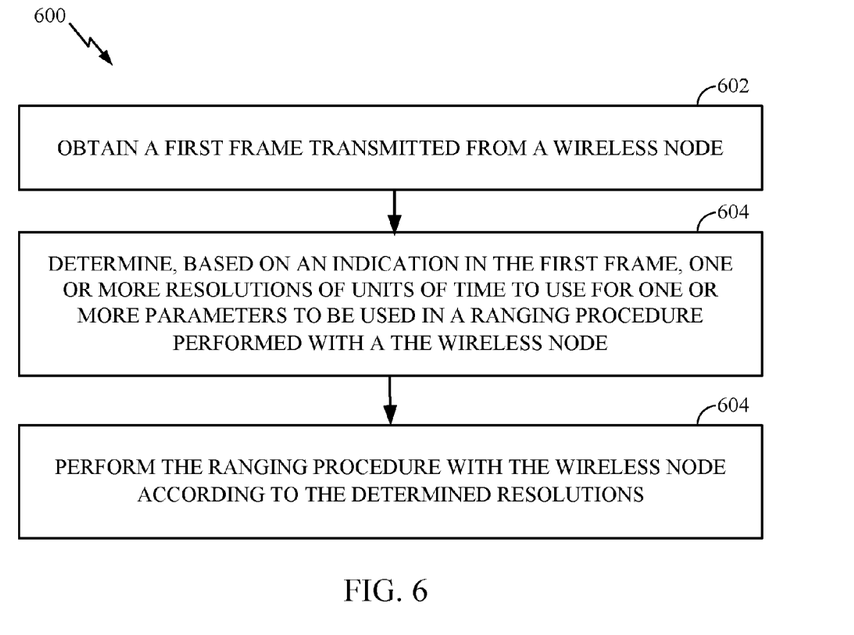
FIG. 6 illustrates a block diagram of example operations for wireless communications by a responding apparatus, in accordance with certain aspects of the present disclosure.

FIG. 6 illustrates a block diagram of example operations 600 for wireless communications by a (different) apparatus, in accordance with certain aspects of the present disclosure. The operations 600 may be considered complementary to the operations 500 of FIG. 5. In other words, operations 600 may be perfumed by a responding STA (e.g., an access point 110 or other type wireless station).

The operations 600 may begin, at 602, by obtaining a first frame transmitted from a wireless node. At 604, the responding STA may determine, based on an indication in the first frame, one or more resolutions of units of time to use for one or more parameters to be used in a ranging procedure performed with the wireless node. At 606, the responding STA performs the ranging procedure according to the determined resolutions.

As noted above, in some cases, the indication of different resolutions for one of more FTM parameters may be provided. In some cases, the indication may be provided in an existing structure (e.g., using an existing frame format).

Figure 7:
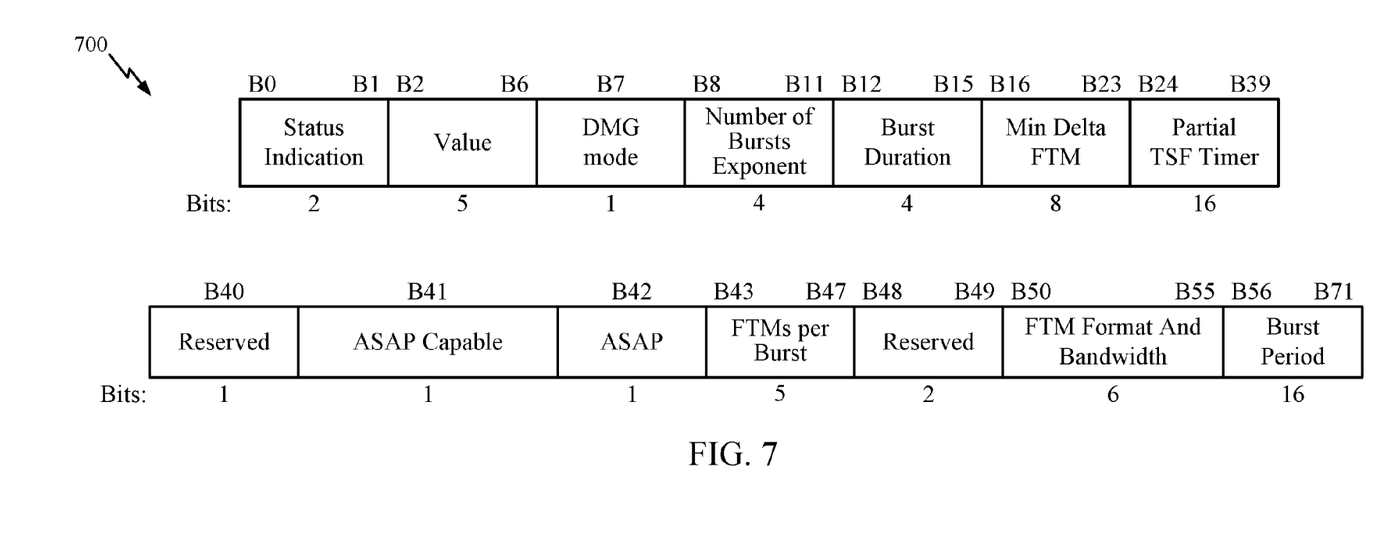
FIGS. 7 and 8 illustrate example resolutions for FTM parameters, in accordance with certain aspects of the present disclosure.

For example, as shown in FIG. 7, a (previously) reserved bit B7 in an FTM parameters set field 700 may be used to indicate a "DMG mode" where one or more FTM parameters use different resolution units (relative to the resolution units used in a "non-DMG mode"). This may be advantageous in that such signaling may have no effect on ongoing Wi-Fi Alliance (WFA) Location certification (e.g., this bit is not required to be any certain value).

Figure 8:
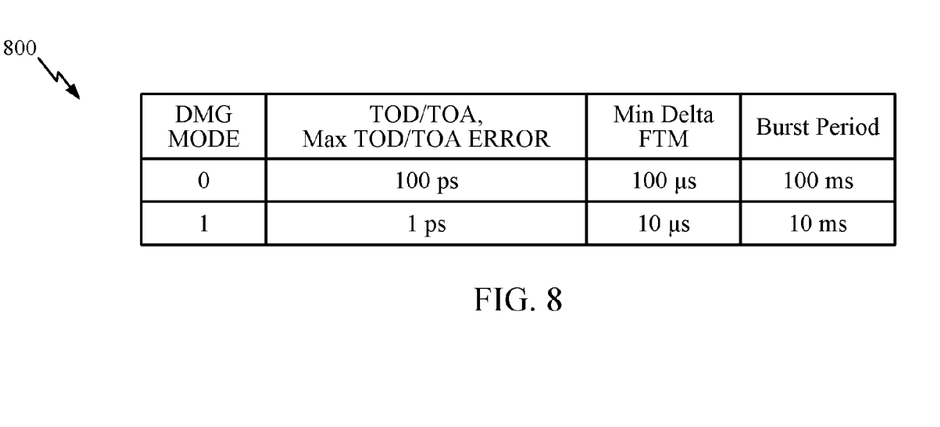

In such cases, as illustrated in FIG. 8, setting this bit (e.g., B7=1) may indicate a change in resolution of one or more of the FTM parameters. For example, setting the bit may indicate that at least one of at least one of a time of departure (TOD), time of arrival (TOA), maximum TOD error, or maximum TOA error may be expressed in time units of 1 ps, rather than 100 ps.

As another example, in DMG mode, the Min Delta FTM field (that indicates a minimum time between consecutive FTM frames) may be expressed in units of 10 μs instead of 100 us. As yet another example, in DMG mode, the burst period may be reported in units of 10 ms instead of 100 ms.

Depending on a particular embodiment, any combination of one or more of the above-mentioned parameters may have different resolutions. Further, in some cases, more than two sets of resolution units may be signaled (e.g., using more than a single bit).

In some cases, separate indications may be provided to indicate different resolutions for different parameters (or different sets of parameters). For example, one indication may be provided as discussed above (B7=1), while a second indication may be provided via one or more bits of another existing field (e.g., FTM Format and Bandwidth). The first indication may indicate different resolutions for a first set of one or more parameters (e.g., TOD, TOA, maximum TOD error, or maximum TOA error), while the second indication may indicate different resolutions for a second set of one or more parameters (e.g., a burst period or Min Delta FTM).

In cases where a multi-bit value is used to access a lookup table, the DMG mode bit may indicate one or more different values are used in the lookup table. For example, the burst duration values (e.g., in 802.11 Table 8-246) may be set to 32 μs for entry 0 and 125 μs for entry 1.

As described herein, resolution of certain FTM parameters for DMG mode may be higher than for 2.4 and 5 GHz, due to the higher bandwidth (as resolution is generally inversely proportional to bandwidth). In some cases, FTM features may be implemented in hardware in DMG mode capable devices (making it advantageous to use higher resolution). In such cases, a packet exchange may include parameters to reduce the overall time of FTM frame exchanges (such as SIFS=3 μs, Preambles=2.5 us, min payload length=0.32 us, for a total delay for these parameters of 2*3+2.5+0.32=8.7 μs).

In some cases, an FTM burst period may be limited to 100 ms, which may limit the accuracy for cases with STA movement. However, using a 10 ms burst duration instead of 100 ms burst duration may provide sufficient resolution, while maintaining low duty cycle. In some cases, a current FTM minimum burst duration (e.g., 250 us) may correspond to 25 FTM measurements when done in DMG. Aspects of the present disclosure, however, may provide for shorter durations (e.g., higher accuracy using relatively fewer FTM measurements).

As noted, the techniques provided herein may allow for improvement in resolution to the FTM protocol, in a backward-compatible manner, that may help enable FTM operation in DMG PHY and allows for precise measurements (e.g., on the order of mm). The proposed changes may have little or no effect on existing (so called "legacy") devices, nor on WFA Location certification of current FTM in 2.4 and 5 GHz bands. The techniques proposed herein may help align FTM to all bands defined in emerging standards, such as the IEEE 802.11REVmc specification. The suggested combination of DMG and FTM may give additional value to both specifications.

According to certain aspects, by applying the ranging techniques described above, devices may be able to achieve ranging results with higher accuracy than previously possible. In addition, the results may be achieved faster and, in some cases, with less overhead than traditional techniques.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In some cases, rather than actually transmitting a frame, a device may have an interface to output a frame for transmission. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

Figure 5A:
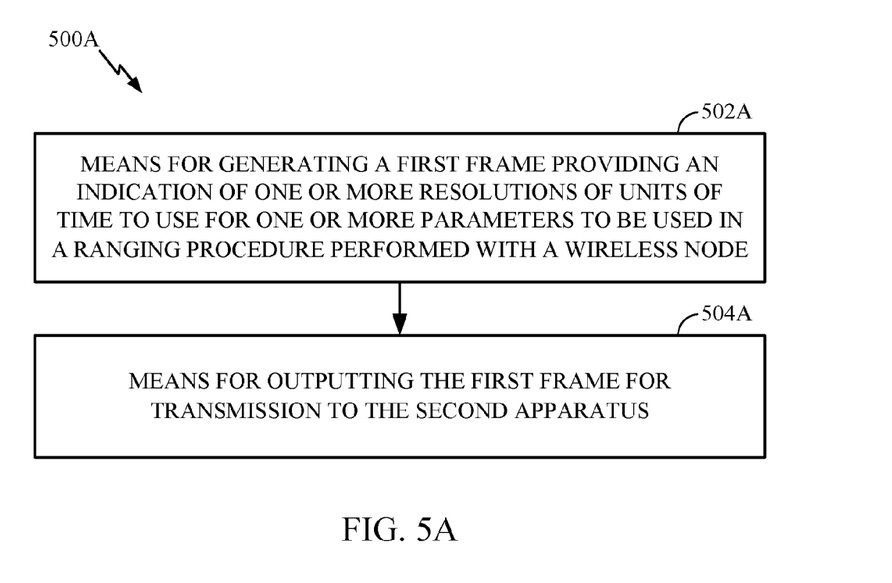
FIG. 5A illustrates example means capable of performing the operations shown in FIG. 5.
Figure 6A:
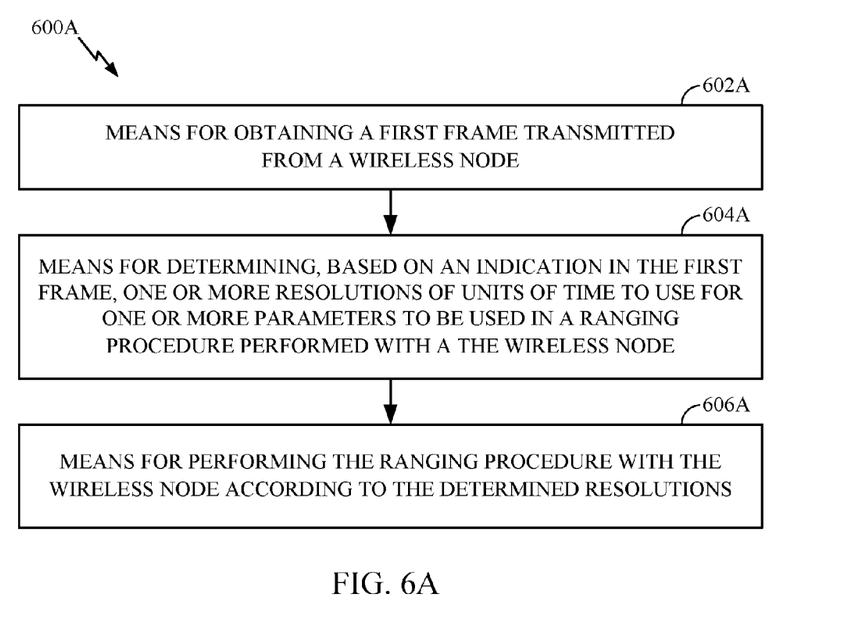
FIG. 6A illustrates example means capable of performing the operations shown in FIG. 6.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 500 and 600 illustrated in FIGS. 5 and 6 correspond to means 500A and 600A illustrated in FIGS. 5A and 6A, respectively.

For example, means for receiving and means for obtaining may be a receiver (e.g., the receiver unit of transceiver 254) and/or an antenna(s) 252 of the user terminal 120 illustrated in FIG. 2 or the receiver (e.g., the receiver unit of transceiver 222) and/or antenna(s) 224 of access point 110 illustrated in FIG. 2. Means for transmitting and means for outputting may be a transmitter (e.g., the transmitter unit of transceiver 254) and/or an antenna(s) 252 of the user terminal 120 illustrated in FIG. 2 or the transmitter (e.g., the transmitter unit of transceiver 222) and/or antenna(s) 224 of access point 110 illustrated in FIG. 2.

Means for generating, means for performing, and means for determining may comprise a processing system, which may include one or more processors, such as the RX data processor 270, the TX data processor 288, and/or the controller 280 of the user terminal 120 illustrated in FIG. 2 or the TX data processor 210, RX data processor 242, and/or the controller 230 of the access point 110 illustrated in FIG. 2.

According to certain aspects, such means may be implemented by processing systems configured to perform the corresponding functions by implementing various algorithms (e.g., in hardware or by executing software instructions) described above. For example, an algorithm for determining a period that at least one second apparatus is scheduled to be awake, an algorithm for generating a first frame for transmission to the second apparatus during the period, an algorithm for outputting the first frame for transmission, an algorithm for obtaining a second frame in response to the first frame, an algorithm for determining ranging information based on a time difference between transmission of the first frame and receipt of the second frame, an algorithm for generate a third frame including the ranging information, and an algorithm for outputting the third frame for transmission. In another example, an algorithm for determining a period to awake from a low power state, an algorithm for obtaining a first frame from a second apparatus during the period, an algorithm for generating a second frame for transmission to the second apparatus in response to the first frame, an algorithm for outputting the second frame for transmission to the second apparatus, an algorithm for obtaining a third frame comprising ranging information, determined by the second apparatus, based on a time difference between transmission of the first frame and receipt of the second frame, and an algorithm for determining a relative location of the second apparatus to the apparatus based on a third frame.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for determining a period that at least one second apparatus is scheduled to be awake, instructions for generating a first frame for transmission to the second apparatus during the period, instructions for outputting the first frame for transmission, instructions for obtaining a second frame in response to the first frame, instructions for determining ranging information based on a time difference between transmission of the first frame and receipt of the second frame, instructions for generate a third frame including the ranging information, and instructions for outputting the third frame for transmission. In another example, instructions for determining a period to awake from a low power state, instructions for obtaining a first frame from a second apparatus during the period, instructions for generating a second frame for transmission to the second apparatus in response to the first frame, instructions for outputting the second frame for transmission to the second apparatus, instructions for obtaining a third frame comprising ranging information, determined by the second apparatus, based on a time difference between transmission of the first frame and receipt of the second frame, and instructions for determining a relative location of the second apparatus to the first apparatus based on a third frame.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device.

Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
    a processing system configured to generate a first frame having an indication of two or more resolutions of units of time from a plurality of different resolutions of units of time to use for two or more parameter fields to be used in a ranging procedure performed with a wireless node, wherein at least two parameters from the two or more parameters have different resolutions of units of time; and
    a first interface configured to output the first frame for transmission to the wireless node.

2. The apparatus of claim 1, wherein the first frame comprises a trigger frame configured to initiate the ranging procedure.

3. The apparatus of claim 2, wherein the trigger frame comprises a fine timing measurement (FTM) request trigger frame.

4. The apparatus of claim 1, further comprising:
    a second interface to obtain one or more second frames during the ranging procedure, the one or more second frames comprising one or more parameters having values generated based on at least one resolution from the two or more resolutions.

5. The apparatus of claim 4, wherein the processing system is further configured to determine a distance between the apparatus and the wireless node, based on the two or more parameters with values reported in the at least one resolution.

6. The apparatus of claim 1, wherein:
    the indication is provided via a fine timing measurement (FTM) parameters element contained in the first frame.

7. The apparatus of claim 6, wherein:
    the indication is provided via at least one bit of the FTM parameters element.

8. The apparatus of claim 1, further comprising:
    a second interface configured to obtain one or more second frames from the wireless node indicating the wireless node rejects use of the two or more resolutions indicated in the first frame; and
    the processing system is configured to generate, after obtaining the one or more second frames, generate one or more third frames during the ranging procedure using one or more resolutions of units of time for the one or more parameters different than the two or more resolutions indicated in the first frame.

9. The apparatus of claim 1, wherein:
    the two or more parameters comprise a parameter that indicates a minimum time between consecutive fine timing measurement (FTM) frames.

10. The apparatus of claim 1, wherein the indication comprises:
    a first indication providing an indication of a resolution of units of time to use for at least a first parameter to be used in the ranging procedure; and
    a second indication providing an indication of a resolution of units of time to use for at least a second parameter to be used in the ranging procedure.

11. The apparatus of claim 10, wherein:
    the first parameter comprises at least one of a time of departure (TOD), time of arrival (TOA), maximum TOD error, or maximum TOA error.

12. The apparatus of claim 10, wherein:
    the second parameter comprises at least one of a burst period or a parameter that indicates a minimum time between consecutive fine timing measurement (FTM) frames.

13. The apparatus of claim 1, wherein:
    the one or more parameters comprise a burst period.

14. An apparatus for wireless communications, comprising:
    a first interface configured to obtain a first frame transmitted from a wireless node; and
    a processing system configured to determine, based on an indication in the first frame, two or more resolutions of units of time from a plurality of different resolutions of units of time to use for two or more parameter fields to be used in a ranging procedure and to perform the ranging procedure with the wireless node according to the determined two or more resolutions, wherein at least two parameters from the two or more parameters have different resolutions of units of time.

15. The apparatus of claim 14, wherein:
    the first frame comprises a trigger frame to initiate the ranging procedure;
    the processing system is configured to generate, after obtaining the trigger frame, one or more second frames for the ranging procedure, the one or more second frames containing one or more parameters having values generated based on the determined two or more resolutions of units of time; and
    the apparatus further comprises a second interface to output the one or more second frames for transmission.

16. The apparatus of claim 15, wherein the trigger frame comprises a fine timing measurement (FTM) request trigger frame.

17. The apparatus of claim 14, wherein the processing system is configured to determine a distance between the apparatus and the wireless node, based on two or more parameters reported in the two or more resolutions by the wireless node.

18. The apparatus of claim 14, wherein:
    the indication comprises at least one bit of a fine timing measurement (FTM) parameters element of the first frame; and
    the processing system is configured to determine the two or more resolutions based on the at least one bit.

19. The apparatus of claim 14, wherein:
    the processing system is configured to generate a second frame with an indication that the apparatus accepts use of the two or more resolutions indicated in the first frame; and
    the apparatus further comprises a second interface configured to output the second frame for transmission.

20. The apparatus of claim 14, wherein:
    the two or more parameters comprise a parameter that indicates a minimum time between consecutive fine timing measurement (FTM) frames.

21. The apparatus of claim 14, wherein the indication comprises:
- a first indication providing an indication of a resolution of units of time to use for at least a first parameter to be used in the ranging procedure; and
- a second indication providing an indication of a resolution of units of time to use for at least a second parameter to be used in the ranging procedure.

22. The apparatus of claim 21, wherein:
the first parameter comprises at least one of a time of departure (TOD), time of arrival (TOA), maximum TOD error, or maximum TOA error.

23. The apparatus of claim 21, wherein:
the second parameter comprises at least one of a burst period or a parameter that indicates a minimum time between consecutive fine timing measurement (FTM) frames.

24. The apparatus of claim 14, wherein:
the two or more parameters comprise a parameter that indicates a burst period.

25. A method for wireless communications by an apparatus, comprising:
- generating a first frame providing an indication of two or more resolutions units of time from a plurality of different resolutions of units of time to use for two or more parameter fields to be used in a ranging procedure performed with a wireless node, wherein at least two parameters from the two or more parameters have different resolutions of units of time; and
- outputting the first frame for transmission to the wireless node.

26. The method of claim 25, wherein the first frame comprises a trigger frame configured to initiate the ranging procedure.

27. The method of claim 26, wherein the trigger frame comprises a fine timing measurement (FTM) request trigger frame.

28. A method for wireless communications by an apparatus, comprising:
- obtaining a first frame transmitted from a wireless node; and
- determining, based on an indication in the first frame, two or more resolution of units of time from a plurality of different resolutions of units of time to use for two or more parameter fields to be used in a ranging procedure performed with the wireless node, wherein at least two parameters from the two or more parameters have different resolutions of units of time; and
- performing the ranging procedure with the wireless node according to the determined resolutions.

29. The method of claim 28, wherein:
the first frame comprises a trigger frame to initiate the ranging procedure;
the method further comprises generating, after obtaining the trigger frame, one or more second frames for the ranging procedure, the one or more second frames containing one or more parameters having values generated based on the determined two or more resolutions of units of time; and
outputting the one or more second frames for transmission.

30. The method of claim 29, wherein the trigger frame comprises a fine timing measurement (FTM) request trigger frame.

* * * * *